UNITED STATES PATENT OFFICE 2,595,723 m-ALLYL-OXY-PHENYL-ISOTHIOCYANATE

Hans Spiegelberg and Gerald Rey-Bellet, Basel, Switzerland, assignors to Hoffmann-La Roche Inc., Nutley, N. J., a corporation of New Jersey No Drawing. Application October 25, 1950, Serial No. 192,151. In Switzerland December 8, 1949

1 Claim. (Cl. 260—454)

The present invention relates to the manufacture of m-allyloxy-phenyl-isothiocyanate which may be represented by the following formula:

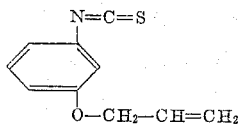

This compound is characterized by its unusually high anthelmintic activity. This anthelmintic effect of said novel compound is very strong not only in pharmacologic experiments but also in vivo on worm-infected animals and human beings. Cats are fully freed of ascarides and taenia by comparatively low doses of this preparation. On human beings, too, oxyuries and ascarides are completely destroyed with doses of few milligrams of m-allyloxy-phenyl-isothiocyanate. It is a specific property of this compound that it exerts a lethal effect on worm species which are zoologically widely different; this is very precious for the therapeutic usefulness of this preparation. In spite of the high toxicity of m-allyloxy-phenyl-isothiocyanate for the various species of worms, it is little toxic for higher animals and for man.

The novel compound may be prepared according to methods known per se (see, for instance, J. Houben, "Die Methoden der organischen Chemie," 3rd edition 1941, vol. 4, pages 45-48) starting from m-allyloxy-aniline, provided the reaction product is stable under the conditions of the reaction.

m-Allyloxy-aniline is easily accessible from m-nitrophenol by allylation of the latter to m-nitrophenol-allyl ether and reduction of the nitro group to the amino group (W. C. Wilson and Roger Adams, Journal of the American Chemical Society, vol. 45, year 1923, pages 528–540). Another possible method is to react m-acetamino-phenol in water or in an inert solvent with an allyl halide in the presence of a hydrogen-halide binding agent and to saponify the acetyl group in the m-allyloxy-acetaniline thus formed.

The m-allyloxy-aniline may be transformed into m-allyloxy-phenyl-isothiocyanate, for instance, according to one of the following modes of procedure:

(a) m-Allyloxy-aniline is reacted with carbon disulphide and alkali or carbon disulphide and a suitable amine to produce the corresponding m-allyloxy-phenyl-dithiocarbamate. Hydrogen sulphide is split off from this dithiocarbamate by means of a heavy metal salt thus leading to the formation of m-allyloxy-phenyl-isothiocyanate.

(b) Another method consists of reacting the above mentioned dithiocarbamate with chloroformic acid ester and thermic decomposition of the reaction product with formation of m-allyl-oxy-phenyl-isothiocyanate, carbon oxysulphide and alcohol.

(c) The dithiocarbamates, prepared according to (a), may also be reacted with phosgene, whereby m-allyloxy-phenyl-isothiocyanate, carbon oxysulphide and hydrogen chloride are formed.

(d) m-Allyloxy-aniline is reacted in water or in an inert solvent with one mol thiophosgene, whereby hydrogen chloride is split off under formation of m-allyloxy-phenyl-isothiocyanate.

(e) m-Allyloxy-aniline is refluxed with carbon disulphide in the presence of a suitable solvent, such as ethanol, whereby symmetric di-(m-allyl-oxy-phenyl)-thiourea is formed. Splitting off m-allyloxy-aniline from this symmetric di-(m-allyloxy-phenyl)-thiourea leads to the formation of m-allyloxy-phenyl-isothiocyanate. This cleavage is favoured by agents which, with the amine, form salts or derivatives, such as phosphorus acid or other strong mineral acids, as well as acetic anhydride and acetyl chloride.

(f) m-Allyloxy-aniline is transformed, as described under (e), into di-(m-allyloxy-phenyl)-thiourea. Splitting off hydrogen sulphide, for instance by means of mercury oxide, from this symmetric thiourea derivative will produce carbo-di-(m-allyloxy-phenyl)-imide. Upon heating the latter with carbon disulphide, for instance to 140–150° C. under elevated pressure, m-allyloxy-phenyl-isothiocyanate is obtained.

(g) m-Allyloxy-aniline is reacted with phosgene to form m-allyloxy-phenyl-isocyanate. This compound is transformed, by several hours' heating under elevated pressure to a temperature of 180° C., into carbo-di-(m-allyloxy-phenyl)-imide. Carbon disulphide can be added onto the latter compound, as described under (f).

(h) The m-allyloxy-phenyl-isocyanate, mentioned under (g) is reacted with phosphorus-pentasulphide to produce m-allyloxy-phenyl-isothiocyanate.

(i) m-Allyloxy-aniline is reacted with chloroform and alkali to produce m-allyloxy-phenyl-isonitrile and the latter is transformed into m-allyloxy-phenyl-isothiocyanate by addition of sulphur.

(k) m-Allyloxy-aniline is diazotized and the diazonium salt is reacted, according to Sandmeyer, with copper potassium rhodanide to form m - allyloxy - phenyl - thiocyanate. m-Allyloxyphenyl-isothiocyanate is obtained by heating this compound to 200–250° C.

Example 1

140 parts by weight of m-allyloxy-aniline (B. P.₁₁ 140–142° C.) are added dropwise, within 30 minutes, to 120 parts by weight of thiophosgene which, by strong stirring, is kept suspended in 1000 parts by weight of water. The temperature of the reaction mixture rises to 60–70° C. whereby hydrogen chloride is evolved. After the reaction is completed, the mixture is stirred for another hour and thereupon extracted twice with ether. The ether solution is washed with water to the neutral point, dried over sodium sulphate and distilled. The m-allyloxy-phenyl-isothiocyanate distils under a pressure of 0.05 mm. Hg at 110–112° C.; it forms a water-clear liquid.

Example 2

36 parts by weight of chloro-formic acid ethyl ester are added dropwise, while stirring and maintaining at a temperature of 0–5° C., to a solution of m-allyloxy-phenyl-dithiocarbamate obtained, as usual, from 50 parts by weight of m-allyloxy-aniline, 100 parts by weight of water, 25.3 parts by weight of carbon-disulphide and 13.33 parts by weight of sodium hydroxide in 30 parts by weight of water. After the addition is completed, the mixture is heated to 100° C. for another 2 hours and, after cooling, it is extracted with ether. The ethereal extract is washed with water, drier and distilled under reduced pressure, whereby m-allyloxy-phenyl-isothiocyanate is produced.

Example 3

200 parts by weight of a 20 per cent phosgene solution in toluene are added dropwise, in the cold, to a suspension of m-allyloxy-phenyl-dithiocarbamate which has been prepared from 50 parts by weight of m-allyloxy-aniline, 200 parts by weight of toluene, 27 parts by weight of carbon disulphide and dried ammoniac gas. The reaction mixture is stirred for another hour, the excess phosgene is driven off with air, the ammonium chloride precipitated is separated by filtration and the toluene solution fractionated; the m-allyloxy-phenyl-isothiocyanate distils thereby at 110–115° C. under 0.05 mm. pressure.

We claim:
m-Allyloxy-phenyl-isothiocyanate.

HANS SPIEGELBERG.
GERALD REY-BELLET.

REFERENCES CITED

The following references are of record in the file of this patent:

UNITED STATES PATENTS

| Number | Name | Date |
|---|---|---|
| 2,263,386 | Wester | Nov. 18, 1941 |
| 2,548,741 | Sayre | Apr. 10, 1951 |

FOREIGN PATENTS

| Number | Country | Date |
|---|---|---|
| 330,988 | France | Aug. 28, 1903 |

OTHER REFERENCES

Degering, An Outline of Organic Nitrogen Compounds (1945), pp. 547–549.